United States Patent [19]

Liu et al.

[11] Patent Number: 5,351,033
[45] Date of Patent: Sep. 27, 1994

[54] SEMI-HARD MAGNETIC ELEMENTS AND METHOD OF MAKING SAME

[75] Inventors: Nen-Chin Liu, Parkland, Fla.; Robert C. O'Handley, Andover, Mass.; Wing Ho, Deerfield Beach; Richard Copeland, Boca Raton, both of Fla.

[73] Assignee: Sensormatic Electronics Corporation, Deerfield Beach, Fla.

[21] Appl. No.: 955,319

[22] Filed: Oct. 1, 1992

[51] Int. Cl.$^5$ .......................................... G08B 13/181
[52] U.S. Cl. ...................................... 340/572; 340/551
[58] Field of Search .................................. 340/551, 572

[56] References Cited

U.S. PATENT DOCUMENTS

| | | | |
|---|---|---|---|
| 4,120,704 | 10/1978 | Anderson | 148/103 |
| 4,298,862 | 11/1981 | Gregor et al. | 340/572 |
| 4,510,489 | 4/1985 | Anderson, III et al. | 340/572 |
| 5,191,315 | 3/1992 | Cordery et al. | 340/551 |

OTHER PUBLICATIONS

Magnetization Process in Divitrified Glassy Alloy, R. C. O'Handley, et al.; J. Appl Phys. 57(1), Apr. 15, 1985, pp. 3563–3565.

*Primary Examiner*—Glen Swann
*Attorney, Agent, or Firm*—Robin, Blecker, Daley & Driscoll

[57] ABSTRACT

A semi-hard magnetic element is formed of an amorphous soft iron-metalloid material containing at least 50 atomic percent iron and at least a part of the bulk of which has been crystallized to give the overall element semi-hard magnetic properties.

42 Claims, 9 Drawing Sheets

SEMI-HARD MAGNETIC ELEMENTS AND METHOD OF MAKING SAME

BACKGROUND OF THE INVENTION

This invention relates to magnetic elements and, in particular, to semi-hard magnetic elements and methods of making same.

As used herein, the term semi-hard magnetic element means a magnetic element having semi-hard magnetic properties which are defined herein as a coercivity in the range of about 10–500 Oersted (Oe) and a remanence, after removal of a DC magnetization field which magnetizes the element substantially to saturation, of about 6–9 kilogauss (kG). Semi-hard magnetic elements having these semi-hard magnetic properties have been used in a number of applications. In one particular application, the elements serve as control elements for the tags in a magnetic electronic article surveillance (EAS) system. A magnetic tag of this type is disclosed, for example, in U.S. Pat. No. 4,510,489.

In the tag of the '489 patent, a semi-hard magnetic element is placed adjacent to a magnetostrictive amorphous element. By magnetizing the semi-hard magnetic element substantially to saturation, the resultant remanence magnetic induction of the magnetic element arms or activates the magnetostrictive element so that it can mechanically resonate or vibrate at a predetermined frequency in response to an interrogating magnetic field.

This mechanical vibration results in the magnetostrictive element generating a magnetic field at the predetermined frequency. The generated field can then be sensed to detect the presence of the tag. By demagnetizing the semi-hard magnetic element, the magnetostrictive element is disarmed or deactivated so that it can no longer mechanically resonate at the predetermined frequency in response to the applied field.

The semi-hard magnetic elements presently used for the above tags are formed from materials commercially sold under the tradenames or trademarks Arnokrome-3, Crovac 10/130 and Vicalloy. These materials are crystalline and contain various amounts of iron, cobalt, chromium, vanadium and possibly other constituents. The materials also have certain disadvantages.

One disadvantage is that the materials are costly. Another disadvantage is that forming the materials involves complicated and lengthy processing which is a significant factor contributing to their high cost.

Generally, this processing involves many steps including multiple rolling, annealing and slitting procedures. Also, a large amount of mechanical work is required to reduce the material thickness into the 50 um range which is the typical range required for the magnetic elements.

The need for lengthy processing not only increases costs, but makes it more difficult to control the magnetic properties of the formed magnetic materials. This leads to magnetic elements and, therefore, tags which may be unstable and therefore subject to failure.

U.S. Pat. No. 4,298,862 discloses another magnetic tag in which magnetic elements are used as part of the tag to control activating and deactivating the tag. In the tag of the '862 patent, a soft amorphous ferromagnetic material is used as the signal generating element. In this case, the amorphous material causes perturbations at harmonics of an interrogating magnetic field. These perturbations are then detected to sense the presence of the tag.

The '862 patent mentions a number of soft amorphous ferromagnetic materials which can be used in the tag of the patent. These materials contain various constituents including, for example, Fe, Co, Si, B and P. Also some of these materials are iron rich, contain at least 50 atomic percent iron. The particular iron rich materials mentioned are Fe-B, Fe-Mo-B and Fe-C-Si-B.

In the tag of '862 patent, the magnetic elements are formed as surface portions of the amorphous ferromagnetic material with the bulk of the material remaining amorphous. By magnetizing these elements, the amorphous material becomes biased so that it can no longer perturb the interrogating signal, thereby deactivating the tag.

The '862 patent teaches forming the magnetic elements by crystallizing spaced surface portions of the amorphous ferromagnetic material as or after the material is formed into a strip or ribbon. Controllably processing the amorphous material to form these surface portions is not easily realizable. Thus, this technique does not offer an entirely satisfactory way of providing magnetic elements for a magnetic tag, nor is it usable for tags where it is desired that the magnetic control elements be separate elements from the signal generating elements.

It is also known from an article entitled "Magnetization Process in Devitrified Glassy Alloy" (R. C. O'-Handley, et al., American Institute of Physics, 1965, pp. 3563–65), that magnetic material comprised of amorphous $Co_{84}Nb_{10}B_6$ can be made semi-hard by annealing the material to crystallize its bulk. However, this cobalt rich material is relatively expensive.

It is, therefore, an object of the present invention to provide a semi-hard magnetic element which is relatively easy to manufacture and less expensive than those presently in use.

It is a further object of the present invention to provide a semi-hard magnetic element which is stable.

It is also an object of the present invention to provide a method of making a semi-hard magnetic element which meets the above objectives.

It is a further object of the present invention to provide a magnetic tag and a magnetic EAS system utilizing a semi-hard magnetic element which meets the above objectives.

SUMMARY OF THE INVENTION

In accordance with the principles of the present invention, the above and other objectives are realized in a semi-hard magnetic element formed from an amorphous iron-metalloid material which contains at least 50 atomic per cent iron and at least a part of the bulk of which has been crystallized such that the overall element (i.e., the entire element as bounded by its outer surfaces) exhibits semi-hard magnetic properties. It has thus been recognized in the present invention, that amorphous iron rich alloys, which are magnetically soft, can be suitably processed to crystallize the bulk of the alloys in such a way as to provide an overall element which exhibits semi-hard magnetic properties, a coercivity in the range of about 10–500 Oe and a remanence after magnetization to substantially saturation exceeding about 6–9 kG.

In the method of the invention, an amorphous iron rich material in as-cast ribbon form is processed by first cutting the ribbon to provide elements of desired size.

These elements are then stacked and the stacked elements subjected to an annealing process. Annealing is carried out at a temperature and for a time sufficient to cause crystallization of the bulk of the material such that the coercivity of the overall element is increased to a semi-hard level. The resultant annealed elements thus have the desired semi-hard magnetic properties.

In the examples of the invention to be disclosed herein below, the amorphous iron rich material used to form the magnetic elements has a nominal composition of $Fe_{78}Si_9B_{13}$. Annealing conditions for processing this material and realizing a maximum coercivity are also disclosed.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
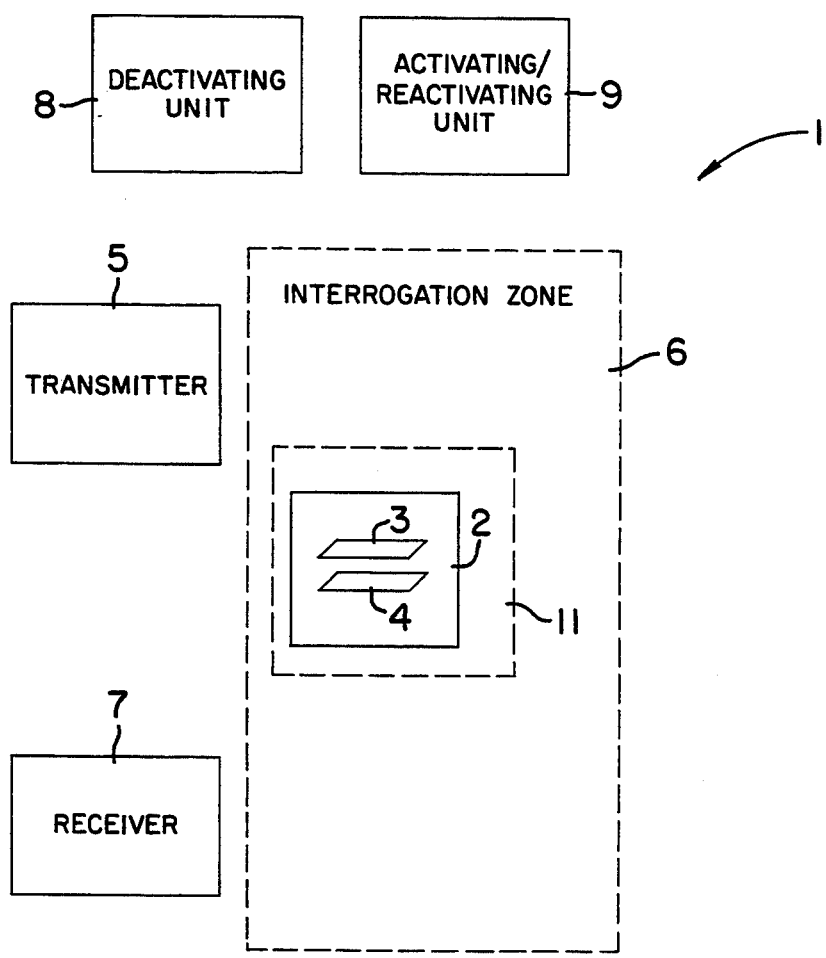
FIG. 1 shows an EAS system using a magnetic tag including a semi-hard magnetic element in accordance with the principles of the present invention.

FIG. 1 illustrates a magnetic EAS system 1 in which the presence of an article 11 in a zone 6 is detected by sensing a tag 2 attached to the article. The tag 2 includes semi-hard magnetic element 3 designed in accordance with the principles of the present invention. The semi-hard magnetic element 3 is used to activate and deactivate an adjacent signal generating element 4 of the tag 2. The signal generating element 4 can be an amorphous magnetostrictive element as described in the aforementioned '489 patent or an amorphous ferromagnetic element.

The EAS system 1 further includes a transmitter 5 which transmits an AC magnetic field into an interrogation zone 6. The presence of the tag 2 and, thus, the article 11 in the zone 6 is detected by a receiver 7 which detects a signal generated by the interaction of the signal generating element 4 of the tag 2 with the transmitted magnetic field.

By placing the semi-hard element 3 in a first magnetic state (magnetized), the signal generating element 4 of the tag can be enabled and placed in an activated state so that it interacts with the applied field to generate a signal. Then by changing the magnetized state of the element 3 (from magnetized to demagnetized), the signal generating element 4 is disabled and placed in a deactivated state so that it no longer interacts with the field to generate a signal. In this way, the tag 2 can be activated, deactivated and reactivated as desired in deactivating unit 8 and activating/reactivating unit 9.

In accordance with the principles of the present invention, the semi-hard magnetic element 3 is formed from a soft amorphous iron rich metalloid material which has been suitably crystallized through its bulk, i.e., through a portion or all of the volume defined by the element. More particularly, the soft amorphous material used to form the element 3 includes at least 50 atomic percent iron and has been crystallized under controlled conditions so that the crystallized bulk of the material exhibits an increased coercivity to render the overall element magnetically semi-hard. A particular range for the iron included in the soft amorphous material might be 50-90 atomic percent iron. Additionally, the amorphous material might desirably be a magnetostrictive material.

It has been found that the soft amorphous iron rich metalloid materials used to form the element 3 can be transformer grade materials which are manufactured and readily available in large quantities. These materials are manufactured in cast ribbon form having thicknesses suitable for use as the magnetic element 3, i.e., having thicknesses in a range from 20 to 50 um.

As a result, by selecting a commercially available transformer grade material of a given thickness to form the element 3, the material cost of the element is reduced and the processing needed to produce the element is less, since there is no need to work the material to obtain the desired element thickness. Moreover, the processing required to crystallize the material is also less stringent. The overall result is a less costly more stable magnetic element 3.

Figure 2:
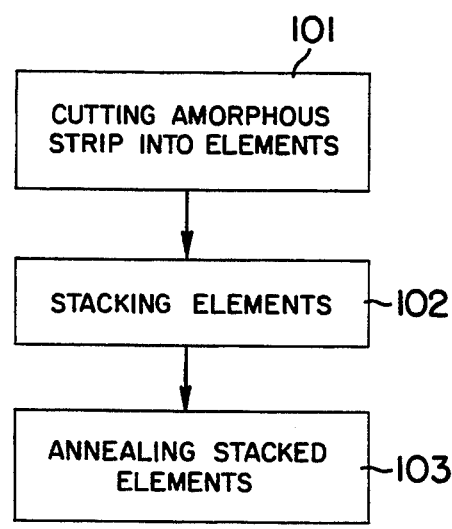
FIG. 2 shows a flow diagram of the processing steps used on an amorphous iron rich metalloid material to form the semi-hard magnetic elements of the invention.

FIG. 2 illustrates the processing steps which can be employed to produce semi-hard magnetic elements usable as the element 3. In a first step 101, an as-cast ribbon or strip of a transformer grade amorphous iron rich metalloid material is cut into suitable elements of dimension required of the magnetic element 3. The cut elements are then stacked in a second step 102. In a further step 103, the stacked elements are annealed at a specified temperature and for a specified time to crystallize the elements and realize the desired semi-hard magnetic properties.

The above processing can be additionally modified to include application of a magnetic field during the annealing. This may enhance the semi-hard magnetic properties achieved in the elements as a result of the annealing process.

The conditions utilized in the annealing step 103 depend upon the specific semi-hard magnetic properties (e.g., specific coercivity and magnetic remenence) desired in the element 3. In order to realize a maximum coercivity, the annealing temperature and time must be suitably selected.

For ease of illustration, FIGS. 3A–3D depict simplified versions of the microstructure for the crystallization process in a representative transformer grade amorphous iron rich metalloid material after annealing at various temperatures. Details of the microstructure, especially at grain boundary areas are not shown in the figures. FIG. 3E shows the coercivity as a function of temperature of the annealed material.

Figure 3A:
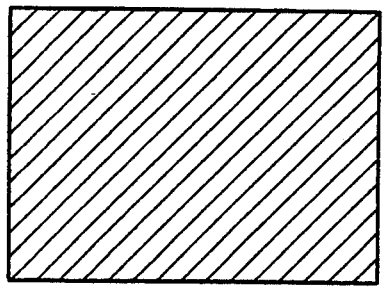
FIGS. 3A-3D show representative changes in the microstructure of an amorphous iron rich metalloid material subjected to different annealing temperatures.

FIG. 3A shows schematically the microstructure of the soft amorphous material before annealing. Since the anisotropy energy is very small in the amorphous material, reverse magnetic domains are readily nucleated when a negative magnetic field is applied to the material after the material has been saturated by a positive magnetic field. In addition, the magnetic domain walls can move freely in the material due to lack of pinning sites associated with grain boundaries or precipitates. This leads to the soft magnetic behavior of the material as evidenced by its relatively low coercivity indicated by the region a in the coercivity characteristic of FIG. 3E.

Figure 3B:
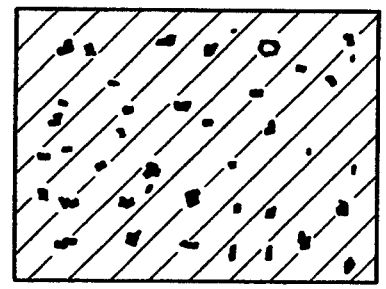
Figure 3C:
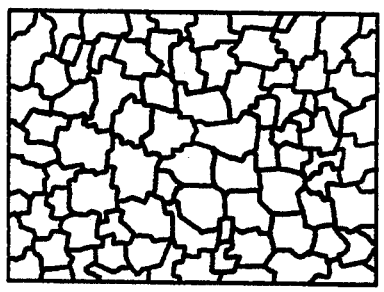

When the amorphous material is annealed at a low temperature, nuclei of a crystalline phase begin to form in the amorphous matrix as shown schematically in FIG. 3B. With this degree of heating, the majority of the material remains in the amorphous state and the magnetization reversal process occurs mainly by moving the magnetic domain walls in the amorphous matrix. However, the formed crystalline nuclei may act as pinning sites for the domain wall movement. As a result, higher field strength is required to overcome this pinning force in order to move the domain walls. Coercivity is increased, but since the size and number of the crystallites are small, only a weak interaction with the domain walls occurs. The increase in coercivity is, therefore, slight as evidenced by region b in FIG. 3E.

As the annealing temperature applied to the amorphous material is increased, the crystallites grow in size and number and thus enhance the pinning forces for the domain wall motion. Also, the volume fraction of the crystalline phase is increased. The magnetization process thus occurs in both the amorphous matrix and the crystalline phase and the coercivity is further increased. The increase of coercivity of the material annealed at this temperature is also due to the crystalline anisotropy of the crystallized phase.

As annealing temperature is further increased, more of the amorphous matrix is transformed into the crystallized phase. The coercivity depends on the dimensions and magnetic properties of the crystallized phase. These factors, in turn, are a function of the annealing condition. Therefore, an optimum annealing condition is eventually reached that yields the maximum coercivity as shown at region c in FIG. 3E.

Figure 3D:
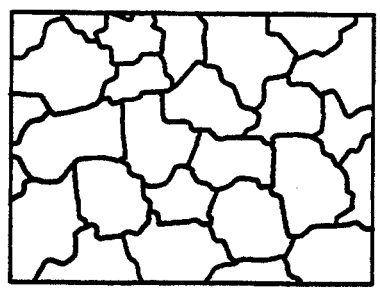
Figure 3E:
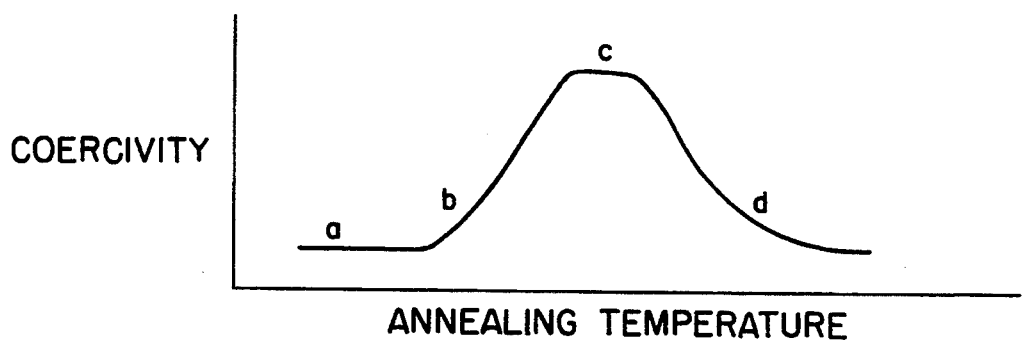
FIG. 3E illustrates a graph of coercivity versus annealing temperature for the amorphous material whose microstructure is shown in FIGS. 3A-3D.

As the annealing temperature is further increased, substantial grain growth occurs in the material as shown in FIG. 3D. Reverse magnetic domains are readily nucleated in these larger grains when a reverse magnetic field is applied, since the larger grains have more surface areas that serve as nucleation sites. This leads to the reduction of the nucleation force and thus a decrease in the coercivity. Region d in FIG. 3E indicates this condition.

As can be appreciated from the above, suitable controlling of the annealing temperature used in the processing step 103 of the invention will result in various increased coercivities and, thus, degrees of semi-hardness for the annealed amorphous material. Also, maximum coercivity for the material can be realized by appropriately selecting the annealing temperature.

Following the above principles and processing steps, transformer grade Metglas ® 2605TCA and 2605S2 materials manufactured by Allied Signal have been processed to form semi-hard magnetic elements suitable for the element 3. These Metglas ® materials have a nominal composition in atomic percent given by the formula $Fe_{78} Si_9 B_{13}$. Of the five examples discussed below, the first 4 examples utilize Metglas ® 2605TCA and the last example Metglas ® 2605S2.

Example 1

An as-cast ribbon of a 2605TCA having a width of 208.3 mm and a thickness of 25 um was cut into elements each having a length of 36.8 mm and a width of 12.3 mm. The long axis of each element coincided with the ribbon's long axis. The elements were isothermally annealed at temperatures between 450° C. and 750° C. for 3 minutes, 10 minutes, and 30 minutes, respectively. $N_2$ gas was used as the annealing atmosphere. Hysteresis loops were measured along the long axis of the elements with a maximum applied field of 250 Oe.

Figure 4:
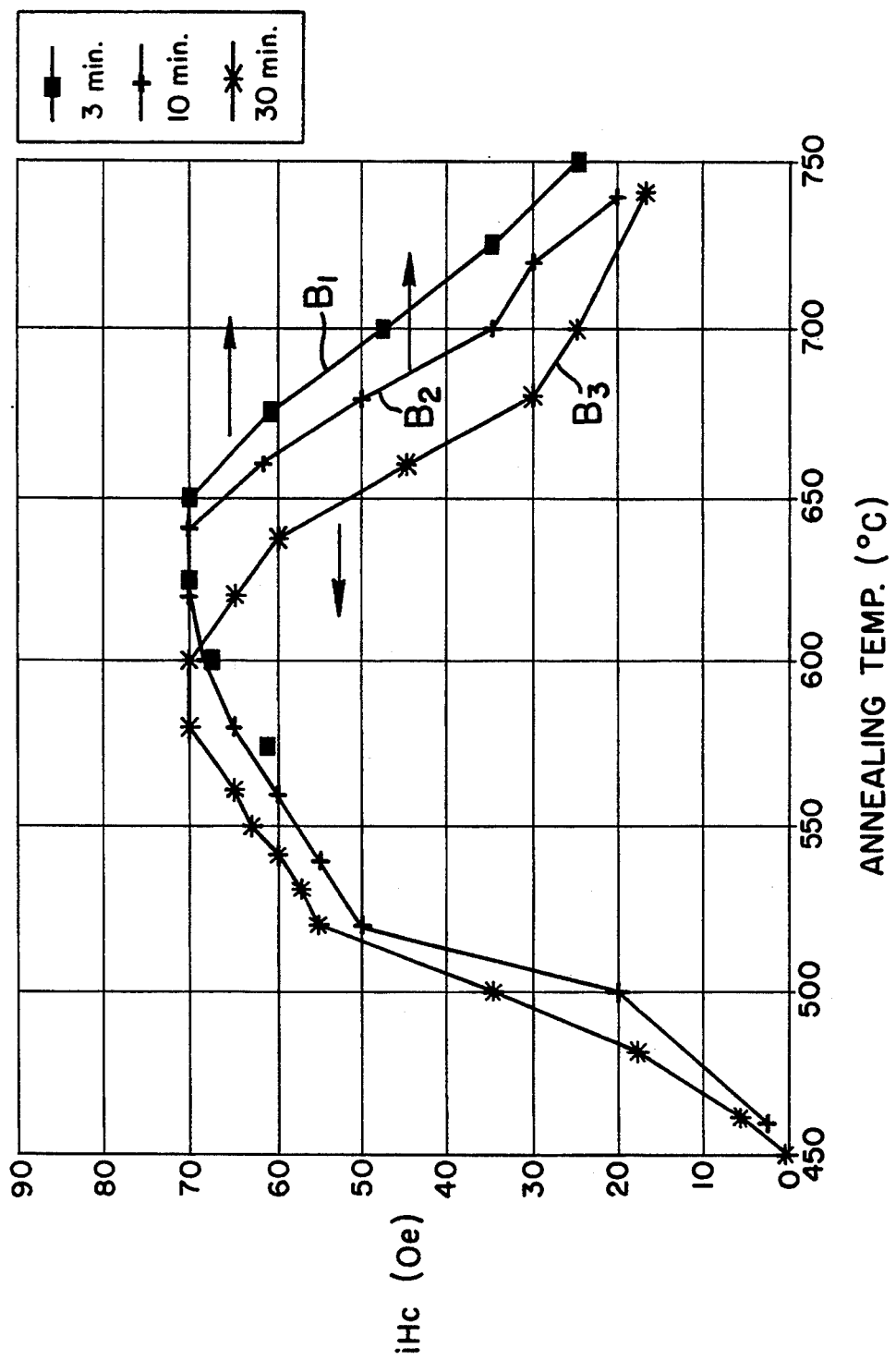
FIG. 4 illustrates graphs of intrinsic coercivity versus annealing temperature of a sample of an iron rich amorphous metalloid material, Metglas ® 2605TCA, which has been annealed for different annealing times in an $N_2$ atmosphere.

FIG. 4 shows graphs $B_1$, $B_2$ and $B_3$ of the intrinsic coercivity of the elements as a function of the annealing temperature for the different annealing times. As can be seen, the maximum intrinsic coercivity of the annealed semi-hard 2605TCA elements was 70 Oe. This occurred at temperatures of 625°–650° C., 620°–640° C. and 575°–600° C. for the different annealing times of 3 minutes, 10 minutes, and 30 minutes, respectively. This can be explained by the fact that nucleation and growth of crystallites involves atomic diffusion. Since the diffusion rate increases as temperature increases, the higher temperature annealing requires shorter time than that of the lower temperature annealing to obtain the same degree of crystallization.

Figure 5:
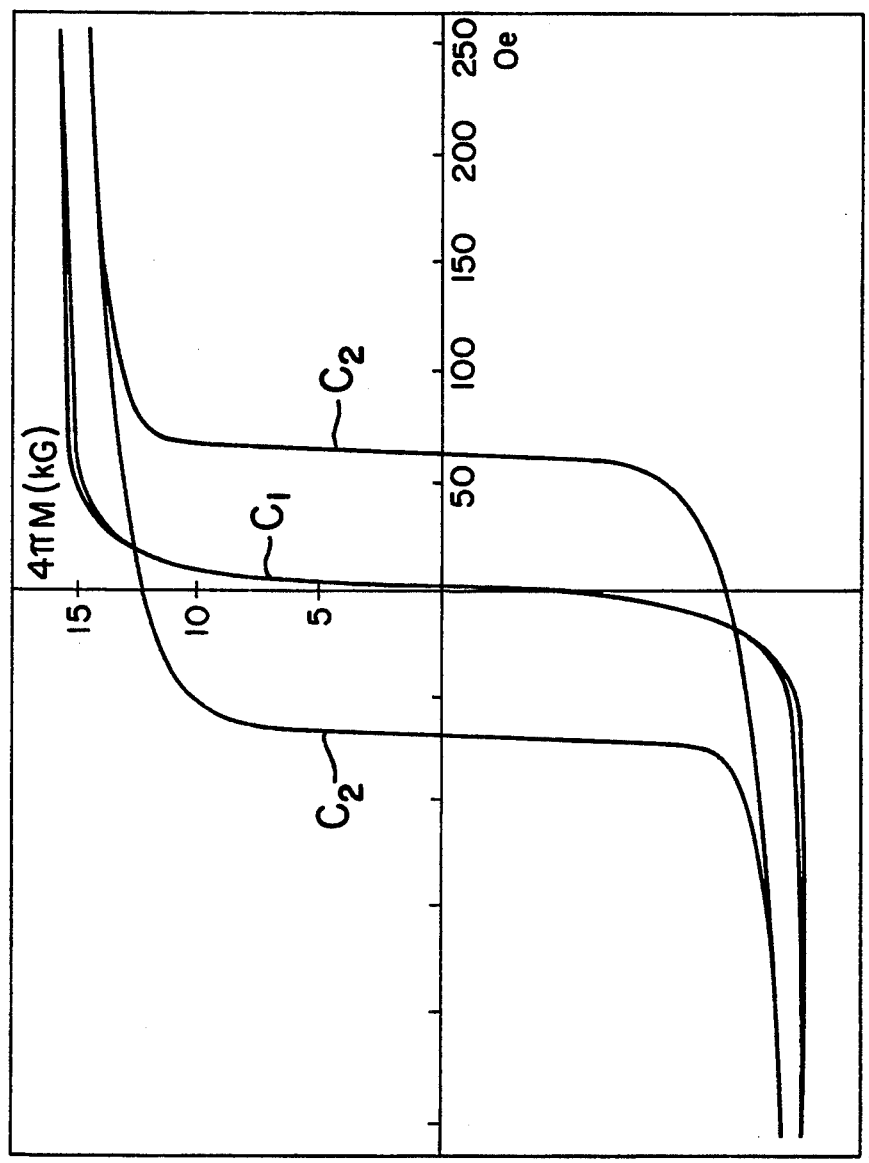
FIG. 5 shows the hysteresis characteristics of samples of an amorphous iron rich metalloid material as-cast and after annealing in accordance with the invention.

FIG. 5 compares the hysteresis loops of 2605TCA material in as-cast state (curve $C_1$) with the semi-hard element of the invention developed by annealing at 600° C. for 30 minutes (Curve $C_2$). The as-cast material was 100 mm long and 12.3 wide. It should be noted that in the hysteresis loops of FIG. 5, the demagnetizing effect has not been corrected.

As can be seen, the coercivity of as-cast 2605TCA was negligible which is indicative of a soft magnetic material. Remanence for the annealed 2605TCA element was about 11 kG, after correction for the demagnetizing effect, and the coercivity was about 70 Oe which is indicative of a semi-hard magnetic element.

Example 2

Elements formed of 2605TCA amorphous material and with the same dimensions as the elements in Example 1 were annealed at temperatures between 525° C. and 650° C. for 30 minutes. The annealing was carried out in air.

Figure 6:
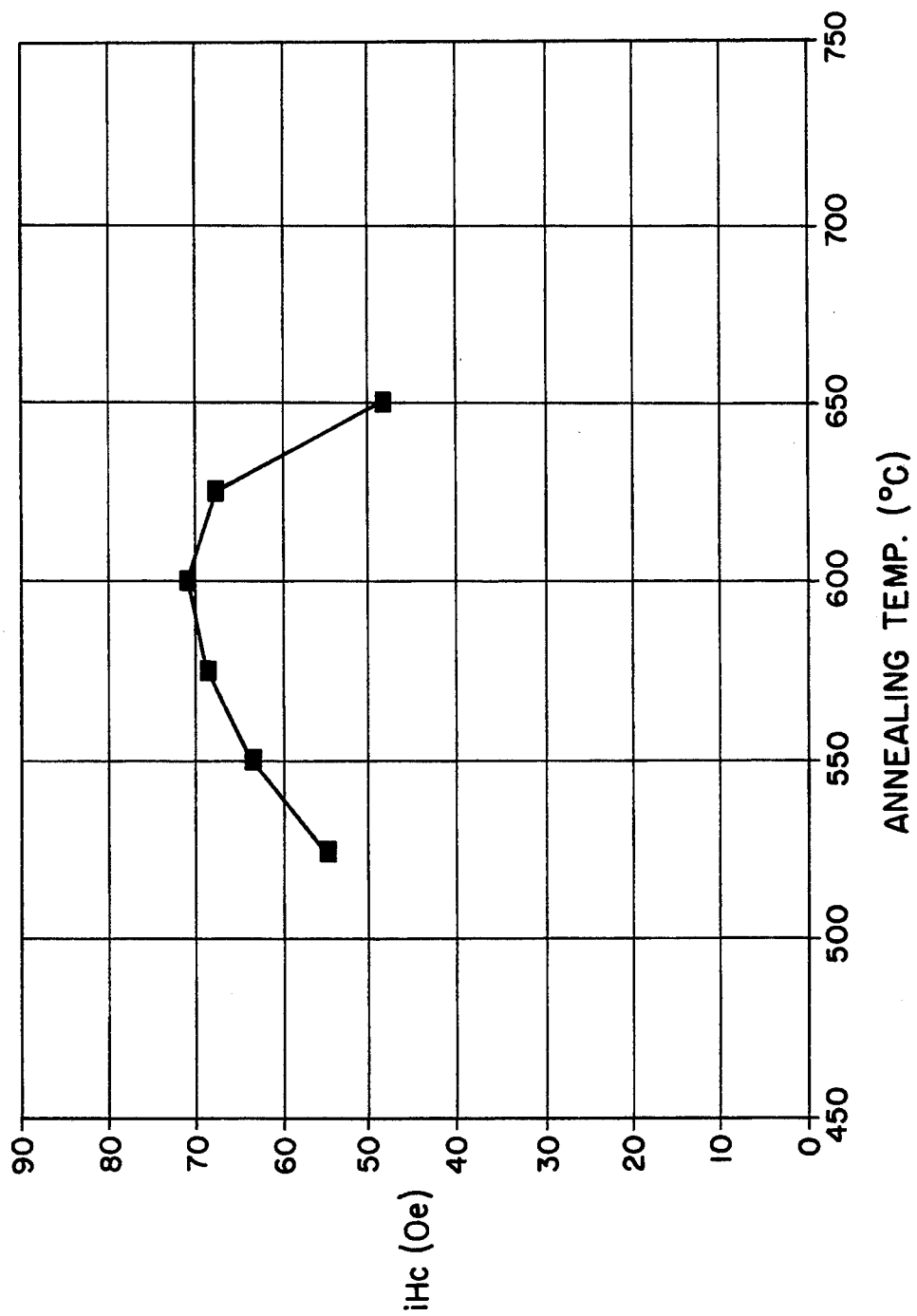
FIG. 6 shows a graph of intrinsic coercivity versus annealing temperature for a sample of an amorphous iron rich metalloid material, Metglas ® 2605TCA, annealed in air for 30 minutes.

FIG. 6 graphs the intrinsic coercivity of the elements versus the annealing temperature. Comparing this graph to the graph in FIG. 4, it is seen that the annealing process to produce semi-hard elements can be carried out in air without seriously degrading the intrinsic coercivity as long as the annealing temperature is below about 625° C. Also no severe oxidation (i.e., only surface oxidation) was found when the elements were annealed at temperatures below 625° C.

Example 3

Figure 7:
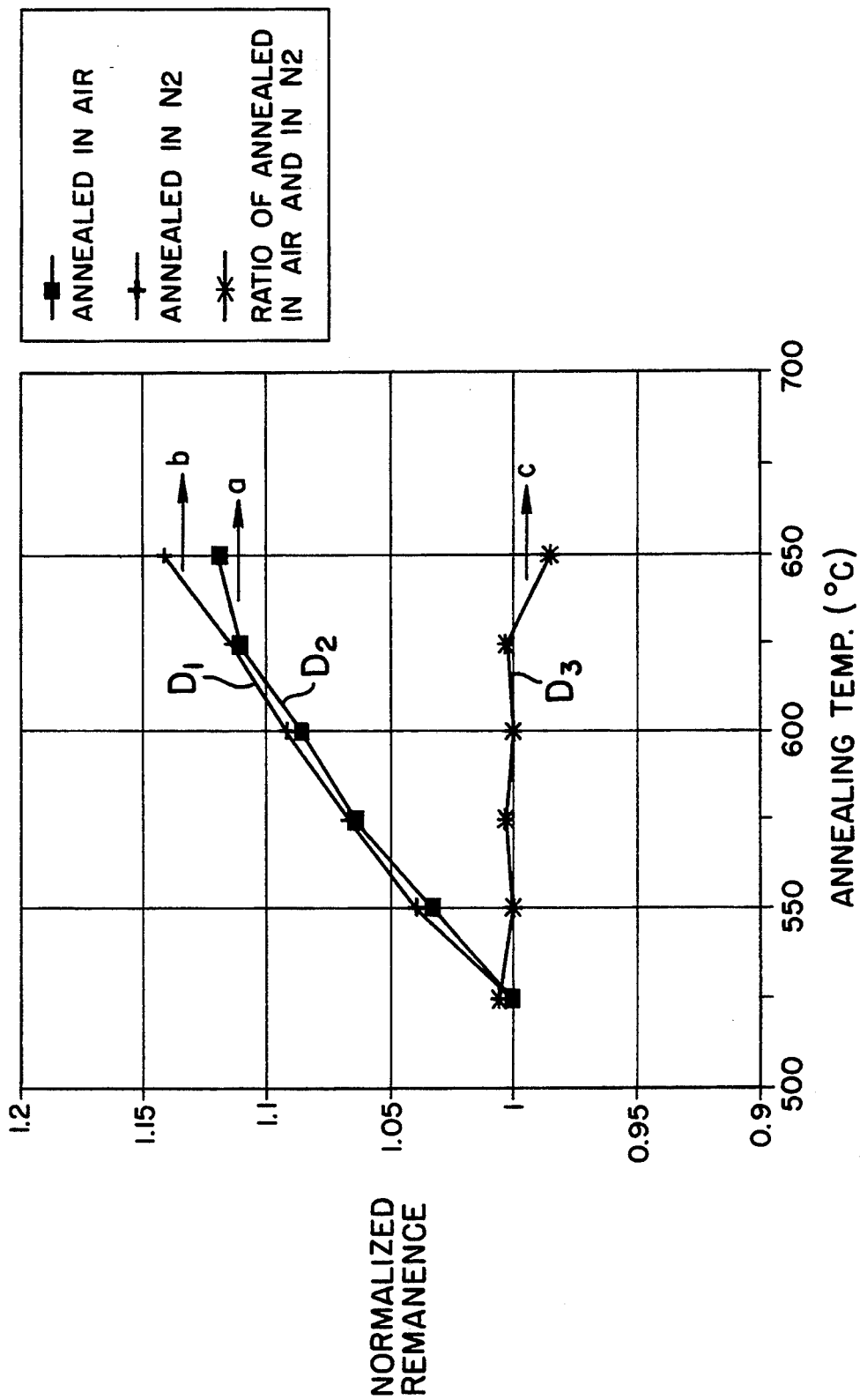
FIG. 7 shows plots of normalized magnetic remanence versus annealing temperature for different gaseous environments for samples of an amorphous iron rich metalloid material, Metglas ® 2605TCA.

Elements formed of 2605TCA amorphous material with the same dimensions as in Example 1 were annealed at temperatures between 525° C. and 650° C. for 30 minutes. The annealing was carried out in both an $N_2$ atmosphere and air atmosphere. The remanence of the elements was measured without correction for the demagnetizing effect. Reduced or normalized remanence i.e., the remanence of a sample annealed at a temperature T divided by that of a sample annealed at a temperature 525° C. was determined. The results are shown in FIG. 7. As this figure shows, remanence increased as the annealing temperature increased from 525° C. to 625° C. in the elements annealed in $N_2$ as well as those annealed in air (curves D1 and D2). Also shown in curve D3 is the ratio of the remanence of the air and nitrogen annealed samples (i.e., the ratio of the remanence of the sample annealed in air and the remanence of the sample annealed in nitrogen at the same temperature). The results indicate that the remanence of the elements annealed in air is similar to that of the elements annealed in $N_2$ within the temperature range between 525° C. and 625° C. A substantially flat line of remanence ratio versus annealing temperature is thus observed in curve D3.

Example 4

Elements of 2605TCA each with a length of 100 mm and a width of 12.5 mm were cut from an as-cast ribbon of 2605TCA material. The elements were loaded into a furnace preheated to 500° C., 525° C., 550° C., 575° C., 600° C. and 625° C. In each case, the temperature of the furnace was then brought up to 625° C. with a constant heating rate of about 8° C./minute. The elements were then isothermally annealed at 625° C. for 30 minutes and fast cooled in air after annealing.

Figure 8:
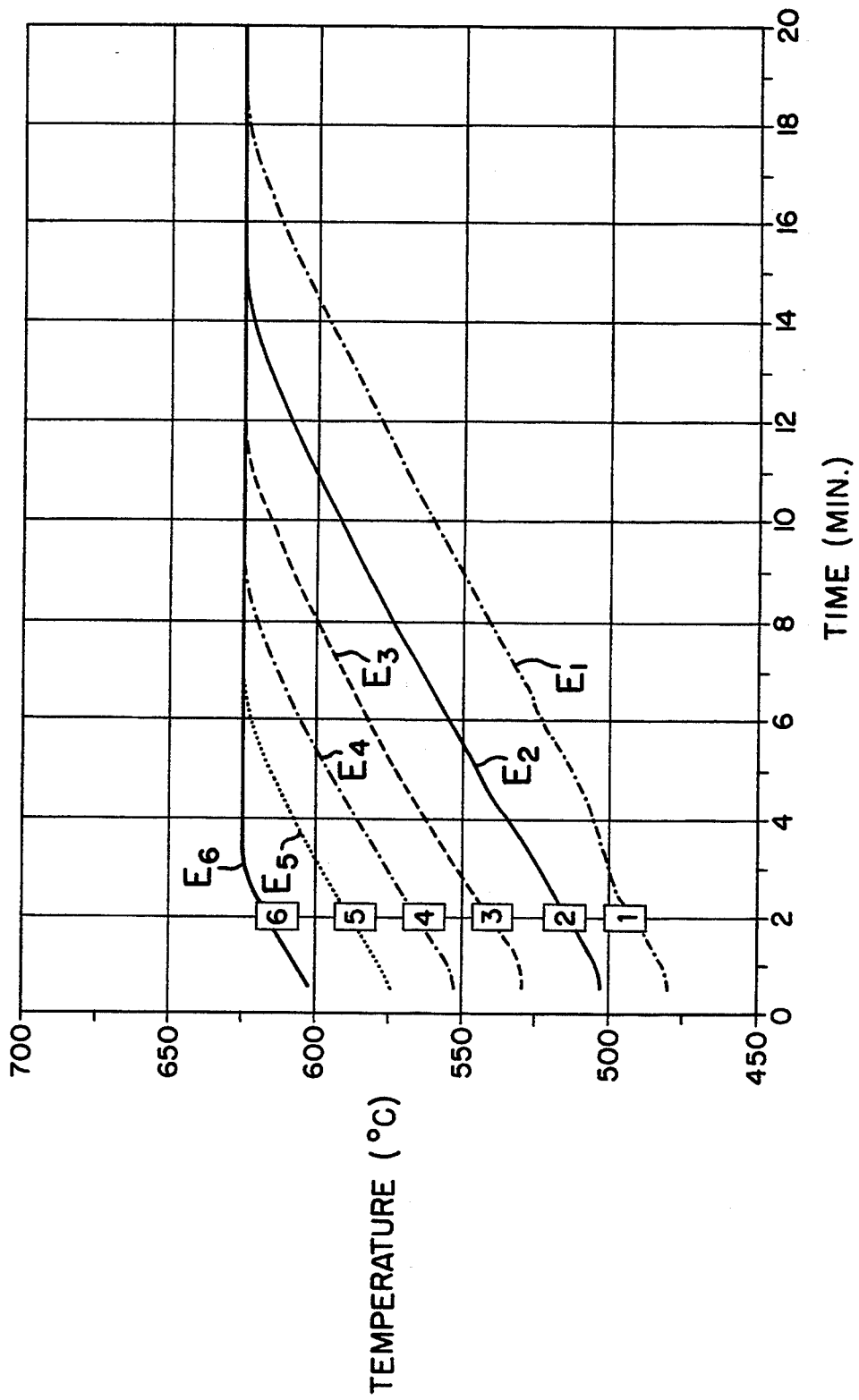
FIG. 8 shows plots of temperature versus time for various annealing cycles carried out on samples of an amorphous iron rich metalloid material, Metglas ® 2605TCA.

FIG. 8 shows the six heating cycles $E_1$ to $E_6$ corresponding to the furnace preheat temperatures of 500° C., 525° C., 550° C., 575° C., 600° C. and 625° C. respectively. The furnace temperature drops about 25° C. after loading the sample elements, as evidenced by the curves.

Figure 9:
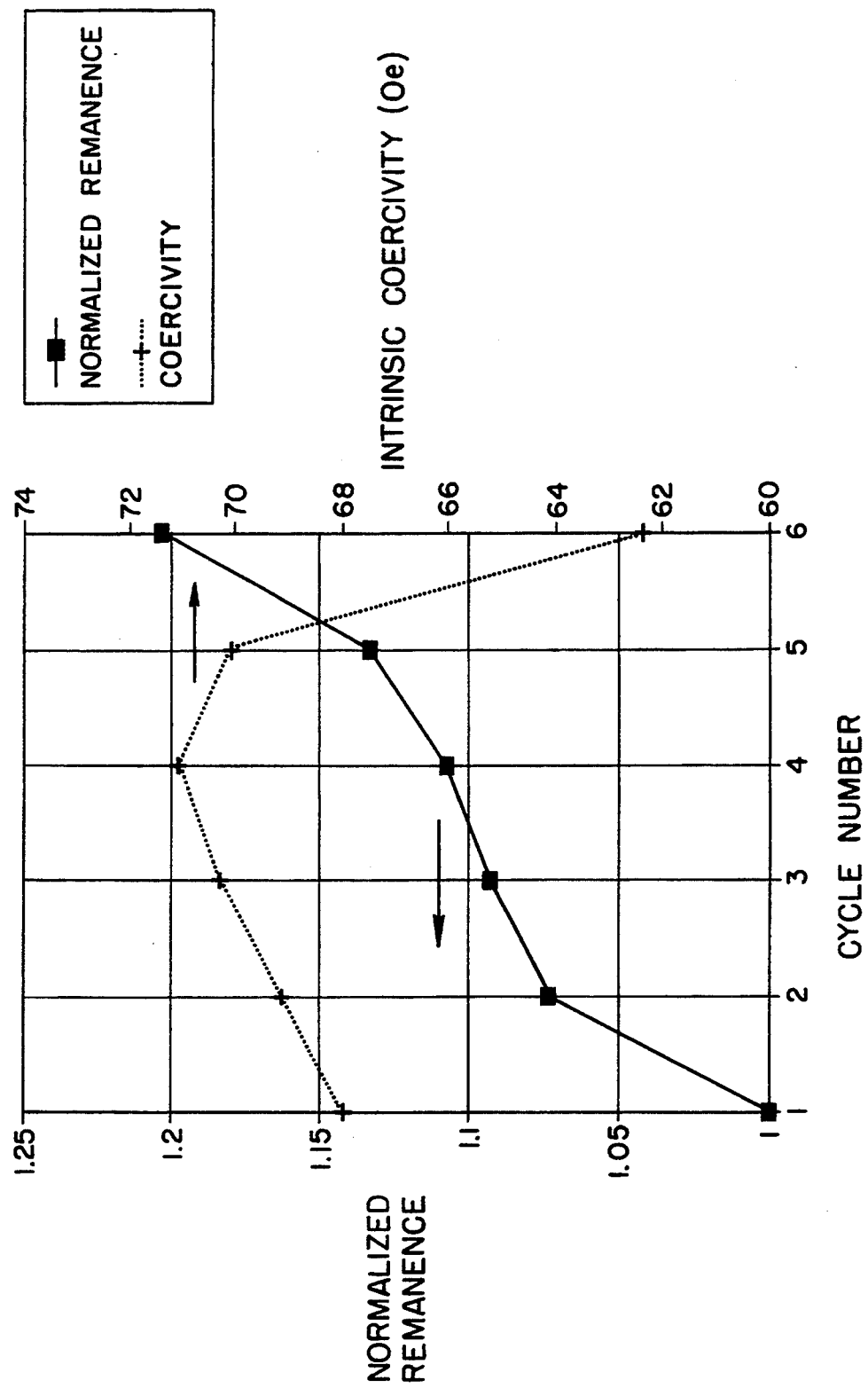
FIG. 9 shows normalized remanence and intrinsic coercivity for the amorphous samples annealed in the annealing cycles of FIG. 8.

Hysteresis loops of the elements were measured with a maximum applied field of 250 Oe. From these loops, the remanence of the elements annealed in each heating cycle normalized to the remanence of the elements annealed in the first heating cycle $E_1$ was plotted and is shown in FIG. 9. Also plotted in FIG. 9 is the intrinsic coercivity of the elements as a function of the heating cycle. As can be appreciated from FIG. 9, the remanence increased monotonically as the preheating temperature of the furnace increased. Also, the elements heated at the highest preheat temperature had a noticeable decrease in intrinsic coercivity.

Example 5

Elements were cut from a ribbon of Metglas ® 2605S2 amorphous material. The ribbon was 12.3 mm wide and 25 um thick. The elements had the same length as those used in Example 1. The elements were isothermally annealed at temperatures between 475° C. and 750° C. for 3 minutes, 10 minutes, and 30 minutes in a $N_2$ gas atmosphere. The hysteresis loops of the elements were then measured along the long axis with a maximum applied field of 250 Oe.

Figure 10:
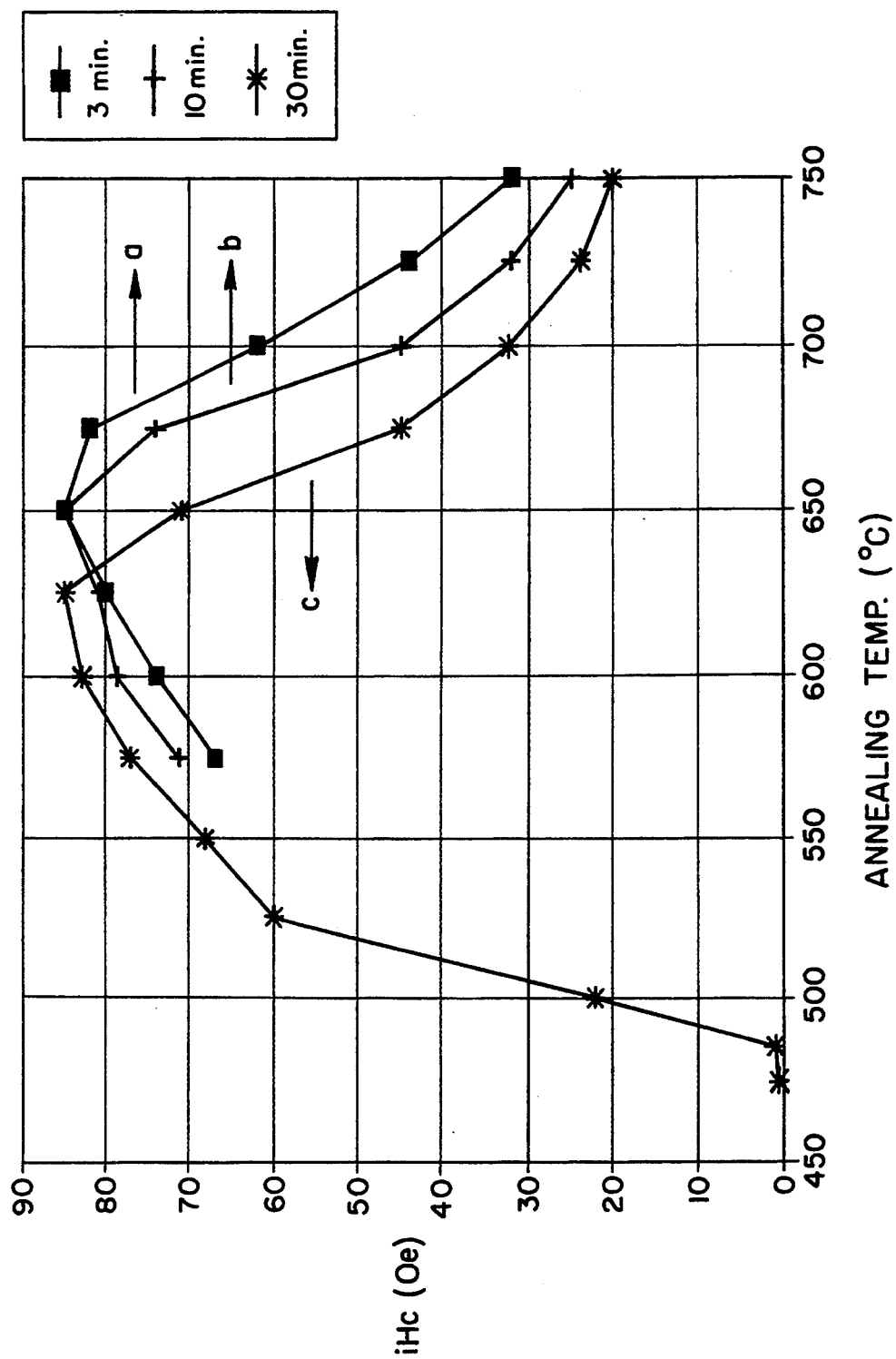
FIG. 10 illustrates graphs of intrinsic coercivity versus annealing temperature for samples of an amorphous iron rich metalloid material, Metglas ® 2605S2, annealed for different times.

FIG. 10 shows a graph of intrinsic coercivity versus annealing temperature for these elements. As can be seen, the maximum intrinsic coercivity of the annealed 2605S2 material was 85 Oe and this occurred at annealing temperatures of 650° C., 650° C. and 625° C. for the annealing times of 3 minutes, 10 minutes, and 30 minutes, respectively. Although the 2605S2 Metglas ® material has the same nominal composition as 2605TCA Metglas ®, the difference in the maximum intrinsic coercivity for the resultant semi-hard elements is believed attributable to the casting process used to make the materials.

While the above examples show processing of Metglas ® 2605TCA and 2605S2 materials to form the semi-hard magnetic elements of the invention, other iron rich materials might also be employed. Thus, iron rich materials containing cobalt and nickel in a total amount of less than 30 atomic percent might also be employed. A material containing one or more of nickel and cobalt, and iron, boron and silicon, i.e., the basic constituents of Metglas ® might be an example. A specific example might be a material which contains 50 atomic percent iron, 30 atomic percent cobalt, and silicon and boron in a combined amount of 20 atomic percent. Additionally, materials such as Nb, Zr, Mo, Cr, Ti, V and No in a combined amount not exceeding 5 atomic percent may be included in the iron rich material.

When carrying out the processing of the amorphous Metglas ® materials in the above examples, the amorphous materials were crystallized throughout substantially their entire volumes so that the overall materials were crystallized. However, the invention is not intended to be limited to overall crystallizing of the materials being processed. Significantly less than the entire volume of a material may need to be crystallized (e.g., as little as about 10% of the volume of the material may need to be crystallized), as long as the overall element can be made to exhibit the desired semi-hard magnetic properties.

Additionally, in carrying out the invention, a desirable overall coercivity for the semi-hard magnetic element might be a coercivity which is at least an order of magntidue greater than the coercivity of the amorphorous magnetically soft material before being formed into the magnetic element. Also, in processing the latter material a possible range of time for the annealing step might be from 3 minutes to 2 hours.

In all cases it is understood that the above-described arrangements are merely illustrative of the many possible specific embodiments which represent applications of the present invention. Numerous and varied other arrangements, can be readily devised in accordance with the principles of the present invention without departing from the spirit and scope of the invention. Thus, for example, instead of using nitrogen as the inert atmosphere during the processing of the magnetically soft amorphous material, argon gas might also be used.

What is claimed is:

1. A magnetic element comprising an amorphous magnetically soft iron-metalloid material at least a part of the bulk of which has been crystallized to give the overall magnetic element semi-hard magnetic properties, said amorphous magnetically soft iron-metalloid material containing at least 50 atomic percent iron.

2. A magnetic element in accordance with claim 1 wherein:

said amorphous material contains between 50 to 90 atomic percent iron.

3. A magnetic element in accordance with claim 2 wherein:
said amorphous material further contains silicon and boron.

4. A magnetic element in accordance with claim 3 wherein:
said amorphous material is of the nominal composition $Fe_{78}Si_9B_{13}$.

5. A magnetic element in accordance with claim 1 wherein:
said magnetic element has a thickness in the range of 20 um–50 um.

6. A magnetic element in accordance with claim 1 wherein:
the coercivity of said overall magnetic element is greater than about 50 Oe.

7. A magnetic element in accordance with claim 1 wherein:
the coercivity of said overall magnetic element is at least an order of magnitude greater than the coercivity of said amorphous material before said amorphous material is formed into said magnetic element.

8. A method of making a magnetic element comprising:
providing a magnetic element comprised of an amorphous magnetically soft iron-metalloid material containing at least 50 atomic percent iron; and
annealing the amorphous material for a time and at a temperature sufficient to crystallize the bulk of the material to give the overall magnetic element semi-hard magnetic properties.

9. A method in accordance with claim 8 wherein:
said amorphous material contains between 50 to 90 atomic percent iron.

10. A method in accordance with claim 9 wherein:
said amorphous material further contains silicon and born.

11. A method in accordance with claim 10 wherein:
said amorphous material is of the nominal composition $Fe_{78}Si_9B_{13}$.

12. A method in accordance with claim 11 wherein:
said annealing temperature is in a range from 500°–750° C.;
and said annealing time is in a range of 3 minutes to 2 hours.

13. A method in accordance with claim 12 wherein:
said annealing temperature is in the range of 625°–650° C.;
and said annealing time is about 3 minutes.

14. A method in accordance with claim 12 wherein:
said annealing temperature is in the range of 620°–640° C.;
and said annealing time is about 10 minutes.

15. A method in accordance with claim 12 wherein:
said annealing temperature is in the range of 575°–600° C.;
and said annealing time is about 30 minutes.

16. A method in accordance with claim 12 wherein:
said annealing temperature is at about 650° C., 650° C. and 625° C. for annealing times of 3, 10 and 30 minutes, respectively.

17. A method in accordance with claim 12 wherein:
said annealing is in an atmosphere of one or more of an inert gas and air.

18. A method in accordance with claim 17 wherein:
said inert atmosphere is one or more of nitrogen and argon.

19. A method in accordance with claim 12 further comprising:
applying a magnetic field to said amorphous magnetic material during said annealing.

20. A method in accordance with claim 12 wherein:
the coercivity of said overall magnetic element is greater than about 50 Oe.

21. A method in accordance with claim 12 wherein:
the coercivity of said overall magnetic element after said step of annealing is at least an order of magnitude greater than the coercivity of said magnetic element prior to said step of annealing.

22. A method in accordance with claim 8 wherein:
said material is of a given thickness;
and said method is conducted exclusive of any steps for reducing the thickness of said material.

23. A method in accordance with claim 22 wherein:
said thickness is in a range between 20 to 50 um.

24. A method in accordance with claim 23 wherein:
said material is in the form of a flat ribbon or strip.

25. A method in accordance with claim 22 wherein:
said thickness is in the range between 20 to 50 um.

26. A method in accordance with claim 8 wherein:
said material is in the form of a flat ribbon or strip.

27. A tag for use in an EAS system comprising:
a signal generating first magnetic element having an activated state in which the signal generating first magnetic element is able to interact with an applied magnetic field and a deactivated state in which the signal generating first magnetic element is disabled from interacting with said applied magnetic field;
a second magnetic element disposed adjacent said signal generating first magnetic element for placing said signal generating first magnetic element in said activated and deactived states, said second magnetic element comprising an amorphous magnetically soft iron-metalloid material at least a part of the bulk of which has been crystallized to give the overall second magnetic element semi-hard magnetic properties, said amorphous magnetically soft iron-metalloid material containing at least 50 atomic percent iron.

28. A tag in accordance with claim 27 wherein:
said second magnetic element has a magnetized state and a demagnetized state which place said signal generating first magnetic element in said activated and deactivated states, respectively.

29. A tag in accordance with claim 27 wherein:
said signal generating first magnetic element comprises an amorphous magnetostrictive material.

30. A tag in accordance with claim 27 wherein:
said signal generating first magnetic element comprises an amorphous ferromagnetic material.

31. A tag in accordance with claim 27 wherein:
said amorphous material of the second magnetic element contains between 50 to 90 atomic percent iron.

32. A tag in accordance with claim 31 wherein:
said amorphous material of the second magnetic element further includes silicon and boron.

33. A tag in accordance with claim 32 wherein:
said amorphous material of the second magnetic element is of the nominal composition $Fe_{78}Si_9B_{13}$.

34. A tag in accordance with claim 27 wherein:
said amorphous material of the second magnetic element has a thickness in the range of 20 um–50 um.

35. A tag in accordance with claim 27 wherein:
the coercivity of said overall second magnetic element is greater than about 50 Oe.

36. An electronic article surveillance system for detecting the presence of a tag in an interrogation zone comprising:
a tag comprising: a signal generating first magnetic element having an activated state in which the signal generating first magnetic element is able to interact with a magnetic field and a deactivated state in which the signal generating first magnetic element is disabled from interacting with said magnetic field; and a second magnetic element disposed adjacent said signal generating first magnetic element for placing said signal generating first magnetic element in said activated and deactivated states, said second magnetic element comprising an amorphous magnetically soft iron-metalloid material at least a part of the bulk of which has been crystallized to give the overall second magnetic element semi-hard magnetic properties, said amorphous magnetically soft iron-metalloid material containing at least 50 atomic percent iron;
means for transmitting said magnetic field into the interrogation zone; and
means for receiving a signal resulting from said signal generating first magnetic element of said tag interacting with said magnetic field.

37. An electronic article surveillance system in accordance with claim 36 wherein:
said signal generating first magnetic element comprises an amorphous magnetostrictive material.

38. An electronic article surveillance system in accordance with claim 36 wherein:
said signal generating first magnetic element comprises an amorphous ferromagnetic material.

39. An electronic article surveillance system in accordance with claim 36 wherein:
said amorphous material of the second magnetic element is of the nominal composition $Fe_{78}Si_9B_{13}$.

40. An electronic article surveillance system in accordance with claim 36 wherein:
said amorphous material of the second magnetic element material has a thickness in the range of 20 um–50 um and is in the form of a strip or ribbon.

41. An electronic article surveillance system in accordance with claim 36 wherein:
the coercivity of said overall second magnetic element is greater than about 50 Oe.

42. A method for detecting the presence of a tag in an interrogation zone comprising:
providing a tag comprising: a signal generating first magnetic element having an activated state in which the signal generating first magnetic element is able to interact with a magnetic field and a deactivated state in which the signal generating first magnetic element is disabled from interacting with said magnetic field; and a second magnetic element disposed adjacent said signal generating first magnetic element for placing said signal generating first magnetic element in said activated and deactivated states, said second magnetic element comprising an amorphous magnetically soft iron-metalloid material at least a part of the bulk of which has been crystallized to give the overall second magnetic element semi-hard magnetic properties, said amorphous magnetically soft iron-metalloid material containing at least 50 atomic percent iron;
transmitting said magnetic field into the interrogation zone; and
receiving a signal resulting from said signal generating first magnetic element of said tag interacting with said magnetic field.

* * * * *

UNITED STATES PATENT AND TRADEMARK OFFICE
CERTIFICATE OF CORRECTION

PATENT NO. : 5,351,033
DATED : September 27, 1994
INVENTOR(S) : Nen-Chin Liu et al.

It is certified that error appears in the above-identified patent and that said Letters Patent is hereby corrected as shown below:

Col. 2, line 7.  After "rich," insert -- i.e., --.

Col. 2, line 62. After "properties," insert -- i.e., --.

Col. 9, line 40. Change "born" to -- boron --.

Signed and Sealed this

Thirteenth Day of December, 1994

*Attest:*

BRUCE LEHMAN

*Attesting Officer*   *Commissioner of Patents and Trademarks*